United States Patent
Lau et al.

(10) Patent No.: US 9,480,078 B2
(45) Date of Patent: Oct. 25, 2016

(54) CLOSED CONTROL LOOP FOR UPLINK SCHEDULING

(75) Inventors: Katrina Lau, Wallsend (AU); Linda Brus, Vällingby (SE); Graham C Goodwin, Newcastle (AU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 421 days.

(21) Appl. No.: 14/124,889

(22) PCT Filed: Jun. 10, 2011

(86) PCT No.: PCT/SE2011/050716
§ 371 (c)(1),
(2), (4) Date: Dec. 9, 2013

(87) PCT Pub. No.: WO2012/169947
PCT Pub. Date: Dec. 13, 2012

(65) Prior Publication Data
US 2014/0112281 A1 Apr. 24, 2014

(51) Int. Cl.
*H04W 72/12* (2009.01)

(52) U.S. Cl.
CPC ..... *H04W 72/1231* (2013.01); *H04W 72/1226* (2013.01); *H04W 72/1252* (2013.01)

(58) Field of Classification Search
None
See application file for complete search history.

(56) References Cited

U.S. PATENT DOCUMENTS

| | | | | |
|---|---|---|---|---|
| 9,001,686 B2* | 4/2015 | Wigren | ......... | H04W 24/08 370/252 |
| 9,007,947 B2* | 4/2015 | Wigren | ......... | H04L 5/0073 370/252 |
| 9,020,548 B2* | 4/2015 | Wigren | ......... | H04W 72/1252 455/452.2 |
| 9,301,172 B2* | 3/2016 | Wigren | ......... | H04W 24/08 |
| 2005/0227697 A1* | 10/2005 | Borst | ......... | H04W 72/085 455/450 |
| 2008/0279121 A1* | 11/2008 | Englund | ......... | H04B 17/336 370/278 |
| 2009/0147678 A1* | 6/2009 | Xhafa | ......... | H04L 1/0002 370/232 |
| 2011/0014925 A1* | 1/2011 | Antic | ......... | H04W 16/06 455/452.2 |
| 2011/0128926 A1* | 6/2011 | Nama | ......... | H04W 72/1252 370/329 |
| 2012/0115522 A1* | 5/2012 | Nama | ......... | H04W 72/0473 455/501 |
| 2013/0324175 A1* | 12/2013 | Wigren | ......... | H04W 72/1252 455/509 |
| 2014/0112164 A1* | 4/2014 | Wigren | ......... | H04W 24/08 370/252 |

FOREIGN PATENT DOCUMENTS

| | | | | |
|---|---|---|---|---|
| EP | 1971167 A1 * | 9/2008 | ......... | H04W 72/085 |
| EP | 2117186 A1 | 11/2009 | | |
| EP | 2242308 A1 * | 10/2010 | ......... | H04L 1/0003 |
| EP | 2117186 B1 * | 7/2014 | ......... | H04L 12/5693 |
| WO | 2006077141 A1 | 7/2006 | | |
| WO | 2011049495 A1 | 4/2011 | | |
| WO | WO 2011049495 A1 * | 4/2011 | ......... | H04W 52/146 |

* cited by examiner

*Primary Examiner* — Ayaz Sheikh
*Assistant Examiner* — Faiyazkhan Ghafoerkhan
(74) *Attorney, Agent, or Firm* — Coats & Bennett, PLLC

(57) ABSTRACT

An exemplary scheduling system and method implemented in a base station comprises a modeling unit, a prediction unit, and a scheduling unit incorporated into a control loop. The modeling unit determines a modeled air-interface parameter by modeling, e.g., a load or interference parameter, associated with the mobile terminals during a current transmission interval based on an earlier set of scheduling grants generated for the mobile terminals. The prediction unit determines a predicted error for a subsequent transmission interval based on the modeled parameter and a measured parameter reported by the mobile terminals during the current transmission interval. The scheduling unit generates a new set of scheduling grants for the mobile terminals for the subsequent transmission interval based on the predicted error.

24 Claims, 16 Drawing Sheets

CLOSED CONTROL LOOP FOR UPLINK SCHEDULING

TECHNICAL FIELD

The following generally relates to uplink scheduling, and more particularly to closed-loop control of scheduling enhanced uplink traffic in a wireless system.

BACKGROUND

Wideband Code Division Multiple Access (WCDMA) is a $3^{rd}$ Generation Partnership Project (3GPP) air-interface standard that generally achieves higher speeds and supports more users than many other wireless communication standards. To better utilize WCDMA resources, particularly during times when uplink interference is favorable, WCMDA may use an Enhanced Uplink (EUL) feature to increase capacity and throughput and to reduce delay.

The effectiveness of EUL largely depends on the effectiveness and/or accuracy of the scheduler used to schedule the uplink traffic. In general, the scheduler is responsible for scheduling EUL traffic to multiple users and enhancing user and cell capacity. At the same time, the scheduler is responsible for keeping track of the air-interface cell load and avoiding over-scheduling, keeping track of other available traffic, e.g., transport resources and hardware, receiving, measuring, and estimating variables relevant to the scheduling operation, and transmitting scheduling orders to the mobile terminals, primarily in the form of granted power/bitrates. The scheduler also needs to operate within the constraints specified by the 3GPP standard, e.g., with respect to limited grant transmission capacity, grant transmission delays, grant step up rate limitations, standard limited UE status information, etc.

Conventional schedulers use various different approaches to schedule EUL traffic. For example, a scheduler may allocate the maximum data rate to all mobile terminals as long as resources are available in an order defined by a priority list. When sufficient resources are not available, the scheduler invokes overload handling, which reduces the priority of the mobile terminals with the best grant. Such scheduling practices experience a dead time until re-scheduling takes effect, which results in a loss of capacity. Another conventional scheduler may implement EUL scheduling based solely on a current air-interface load. While the current air-interface load is a useful scheduling tool, it does not account for errors that may occur when estimating the current air-interface load. Such estimation errors reduce the efficiency and increase the losses associated with these schedulers.

Overall, conventional schedulers do not properly account for previous scheduling decisions, delays, and/or exact timing associated with the scheduling process. Further, conventional scheduling algorithms do not fully or directly account for a measured air-interface load. Thus, there remains a need for improved EUL scheduling.

SUMMARY

The scheduling system and corresponding method described herein improves scheduler performance by accounting for important timing and delay considerations, the effects of past scheduling decisions, and the measured air-interface load. More particularly, the scheduling system and corresponding method incorporates a scheduler into a closed scheduling control loop. The scheduler generates scheduling grants based on a target scheduling parameter. The control loop monitors how the scheduling grants affect interference/load experienced by the mobile terminals to determine and account for inaccuracies in the target scheduling parameter.

An exemplary scheduling system disposed in a network node, e.g., a base station, comprises a modeling unit, a prediction unit, and a scheduling unit. The modeling unit determines a modeled air-interface parameter by, e.g., modeling a load or interference parameter, associated with the mobile terminals during a current transmission interval based on an earlier set of scheduling grants generated for the mobile terminals. The prediction unit determines a predicted error for a subsequent transmission interval based on the modeled air-interface parameter and a measured air-interface parameter reported by the mobile terminals during the current transmission interval. The scheduling unit generates a new set of scheduling grants for the mobile terminals for the subsequent transmission interval based on the predicted error.

An exemplary scheduling method implemented at a network node, e.g., a base station, determines a modeled air-interface parameter associated with the mobile terminals during a current transmission interval based on an earlier set of scheduling grants generated for the mobile terminals to obtain modeled interference. The method then determines a predicted error for a subsequent transmission interval based on the modeled air-interface parameter and a measured air-interface parameter reported by the mobile terminals during the current transmission interval. The method subsequently generates a new set of scheduling grants for the mobile terminals for the subsequent transmission interval based on the predicted error.

DETAILED DESCRIPTION

Conventional schedulers generate absolute and/or relative scheduling grants, i.e., based on a current air-interface load, and send the scheduling grants to the UEs. A UE in a 3GPP network receives the scheduling grant(s), where each relative scheduling grant can only change the scheduled grant of the UE by one step. The UE generates a serving grant, which represents the grant actually used by the UE for uplink transmission based on the received scheduling grant(s). The UE also computes the power to be used for uplink transmission based on the received scheduling grant(s), e.g., by using beta factors computed as nonlinear functions of the scheduled grant(s). More particularly, the UE computes the power to be used for uplink transmission based on a serving grant, which is generated by the UE based on the received scheduling grant. There is a delay associated with this process, e.g., the delay associated with the transmission of the scheduling grant(s), the generation of the serving grant and computation of the beta factors, etc. In any event, the UE subsequently transmits the user data in accordance with the computed power. In addition, the UE signals the generated serving grant to the network node. It will be appreciated that the UE may also signal other information useful to the scheduling process, e.g., amount of data in the UE's buffer, transport format used, etc.

Figure 1:
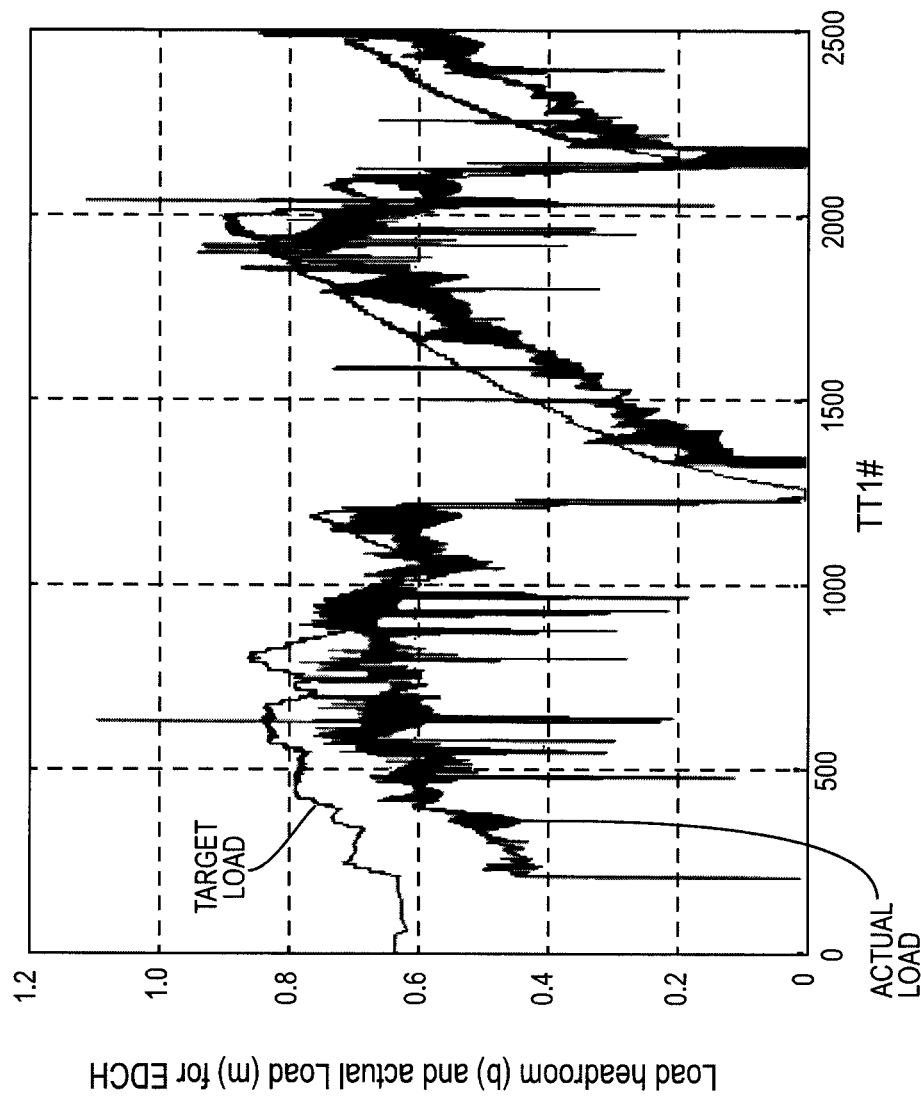
FIG. 1 shows simulated differences between the target load and the actual load for a conventional scheduler.
Figure 2:
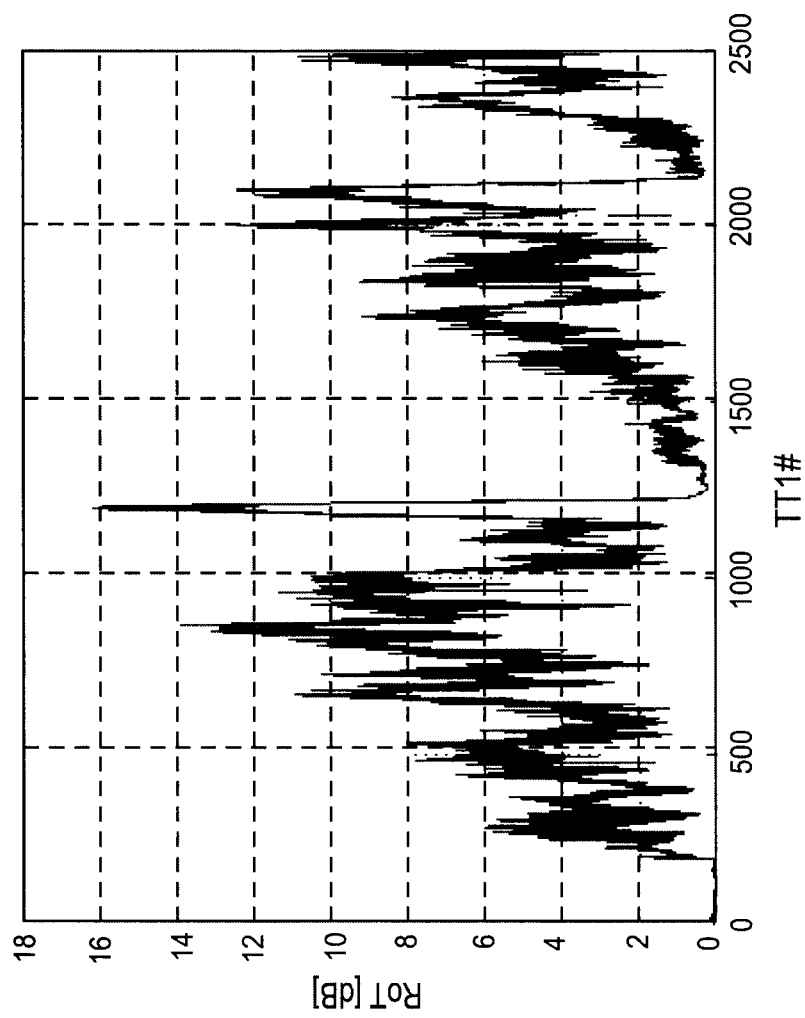
FIG. 2 shows simulated rise-over-thermal (RoT) results for a conventional scheduler.

Conventional schedulers generally do not account for the delay between when the scheduler generates the scheduling grant(s) and the UE receives/uses the scheduling grant(s). Further, conventional schedulers generally do not properly account for previous scheduling decisions, measured air-interface load, timing, etc. These omissions prevent the scheduler from optimizing the distribution of the uplink resources. FIGS. 1 and 2 show simulation results demonstrating the problems caused by prior art schedulers. These simulations use the target load derived from Equation (2), and represent a one-cell system simulation. The simulations assume ideal estimation of the serving grants, ideal parameter modeling with no modeling errors, and ideal grant uptake, e.g., $\overset{v}{u}'(k) \approx \overset{v}{u}(k)$.

FIGS. 1 and 2 demonstrate how the load on the data/control channels as predicted by a conventional scheduler is significantly higher than the load actually produced. For example, FIG. 1 shows how the target load is offset from the actual load across a wide range of transmission time intervals (TTIs). This offset is caused by unaccounted for delays, air-interface load, etc., and therefore is undesirable. FIG. 2 shows the Rise over Thermal (RoT) across the same range of TTIs. Ideally, the RoT is less than 7 dB, which as demonstrated by FIG. 2 is not always achieved by conventional schedulers.

Embodiments disclosed herein address the problems associated with conventional uplink schedulers by incorporating a static or semi-static scheduler into a dynamic control loop. In so doing the scheduling method and apparatus disclosed herein accounts for the effects of scheduling delays and estimation errors.

Figure 3:
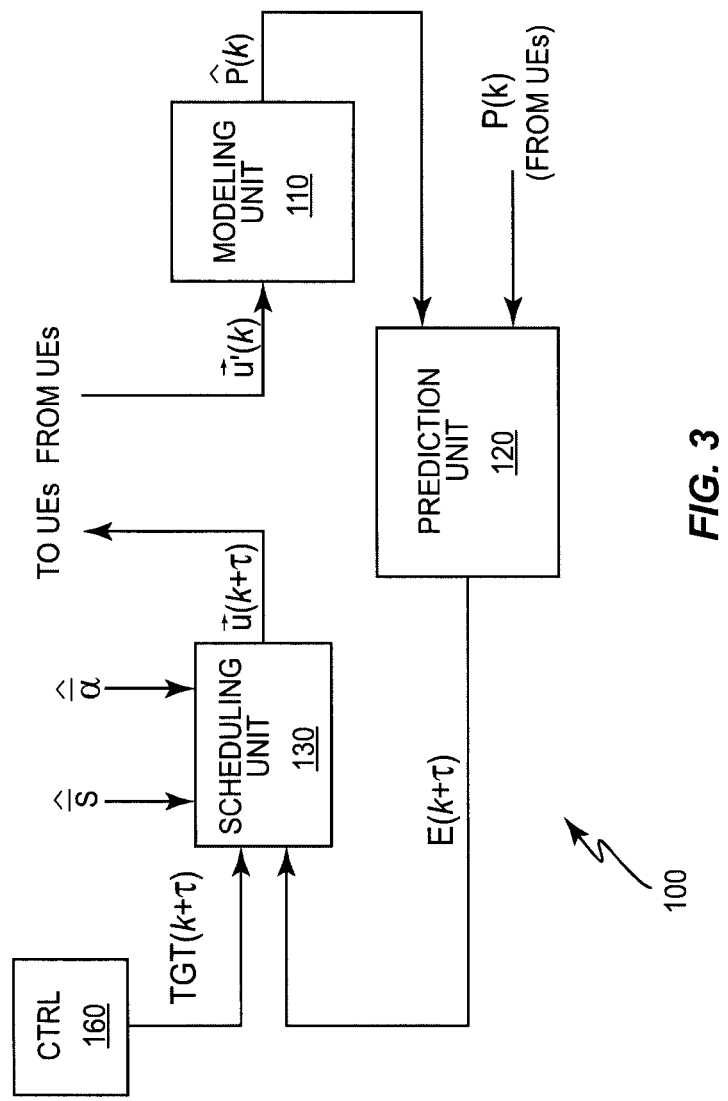
FIG. 3 shows a block diagram of a scheduling system according to one exemplary embodiment.
Figure 4:
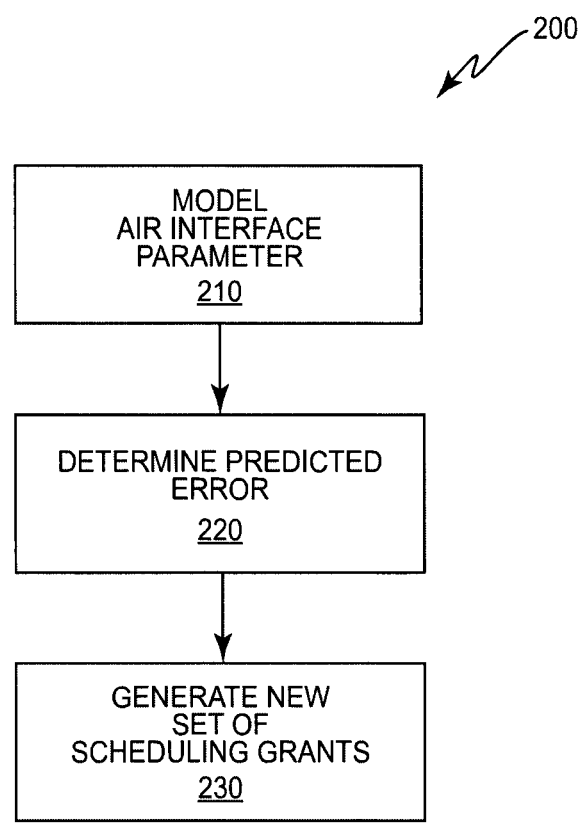
FIG. 4 shows an exemplary scheduling method implemented by the scheduling system of FIG. 3.

FIG. 3 shows an exemplary scheduling system 100 that may be implemented in any network node, e.g., a base station, eNodeB, etc. Scheduling system 100 includes a modeling unit 110, a prediction unit 120, a scheduling unit 130, and a controller 160. These elements work together to generate more efficient scheduling grants for uplink traffic. The scheduling system 100 and the corresponding method 200 of FIG. 4 are generally described herein in terms of 3GPP and Enhanced UpLink (EUL). It will be appreciated, however, that the scheduling system 100 and method 200 may be used to schedule uplink traffic for wireless networks driven by other communication standards.

Modeling unit 110 models an interference, load, or other air-interface parameter $\hat{P}(k)$ associated with the UEs for transmission interval k based on a vector of serving grants $\overset{v}{u}'(k)$ reported by the UEs, where the serving grants $\overset{v}{u}'(k)$ represent the actual grants used by the UEs and generated based on the scheduling grants $\overset{v}{u}(k+\tau)$ (block 210). Prediction unit 120 predicts an error $E(k+\tau)$ based on the modeled parameter $\hat{P}(k)$, and a measured interference, load, or other measured air-interface parameter $P(k)$ reported by the UEs (block 220). It will be appreciated that interference and load are related by a Received Total Wideband Power (RTWP), and therefore, are interchangeable as demonstrated herein. Thus, it will be appreciated that the scheduling system and method disclosed herein may operate based on interference, load, or a combination thereof.

The predicted error $E(k+\tau)$ represents effects of the delays and air-interface estimation errors not accounted for by the scheduling unit 130. The scheduling unit 130 generates the scheduling grants for the subsequent transmission interval $\overset{v}{u}(k+\tau)$ based on the predicted error $E(k+\tau)$ (block 230). For example, the scheduling unit 130 may adjust a target scheduling parameter $TGT(k+\tau)$ provided by controller 160 based on $E(k+\tau)$, and generate $\overset{v}{u}(k+\tau)$ based on the adjusted scheduling parameter $ADJ(k+\tau)$. Controller 160 may generate $TGT(k+\tau)$ using any known means. For example, controller 160 may generate a target load $L_{TGT}$ in the power domain according to:

$$TGT(k+\tau) = L_{TGT}(k) = \text{RoT}_{TGT}(k) N_0, \quad (1)$$

where $\text{RoT}_{TGT}$ represents the target Rise-over-Thermal, and $N_0$ represents the thermal noise floor. Alternatively, controller 160 may generate $L_{TGT}$ in the load domain according to:

$$TGT(k+\tau) = L_{TGT} = 1 - \frac{1}{\text{RoT}_{TGT}}. \quad (2)$$

It will be appreciated that other more advanced techniques and/or other target parameters may alternatively be used.

FIG. 4 shows an exemplary scheduling method 200 implemented by the scheduling system 100. Modeling unit 110 models interference, load, or other air-interface parameters $\hat{P}(k)$ associated with the UEs based on a vector of scheduling grants $\overset{v}{u}(k+\tau)$ (block 210). Prediction unit 120 predicts an error $E(k+\tau)$ for a subsequent transmission interval based on the modeled parameter $\hat{P}(k)$ and a measured interference, load, or other air-interface parameter $P(k)$ reported by the UEs (block 220). The scheduling unit 130 generates the scheduling grants $\overset{v}{u}(k+\tau)$ for the subsequent transmission interval based on the predicted error $E(k+\tau)$ (block 230).

As noted above, modeling unit 110, prediction unit 120, and scheduling unit 130 operate within a control loop according to modern control theory to generate scheduling grants $\overset{v}{u}(k+\tau)$ that account for delays, modeling errors, and air interface load measurements. The following describes various implementations for each unit, where the air-interface parameters used by the scheduling system 100 comprise interference and/or load. It will be appreciated, however, that other air-interface parameters may alternatively be used.

Figure 5:
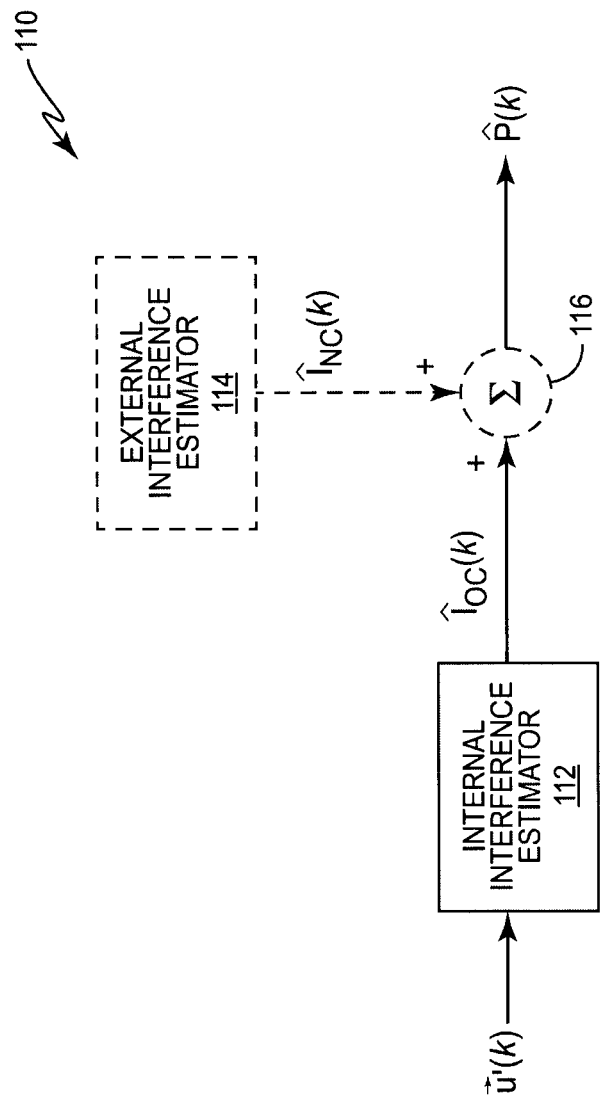
FIG. 5 shows a block diagram of an exemplary modeling unit for the scheduling system disclosed herein.

FIG. 5 shows a block diagram of one exemplary modeling unit 110 configured to model an interference $\hat{P}(k)$. Modeling unit 110 comprises an internal interference estimator 112 configured to model own-cell interference $\hat{I}_{oc}(k)$ experienced by the UEs based on the serving grants $\check{u}'(k)$ using any known techniques. For example, the load for each UE may be estimated based on $\check{u}'(k)$, an estimated signal-to-interference ratio (SIR), and an estimated self-interference factor. Own-cell load may then be estimated by combining the loads estimated for all UEs. $\hat{I}_{oc}(k)$ may then be modeled based on the own-cell load and the RTWP. In some embodiments the modeling unit 110 outputs $\hat{I}_{oc}(k)$ as the modeled interference $\hat{P}(k)$.

The modeling unit 110 may optionally include an external interference estimator 114 and combiner 116. External interference estimator 114 models neighbor-cell interference $\hat{I}_{nc}(k)$ experienced by the UEs using any known techniques. For example, one method for modeling neighbor-cell interference involves subtracting a thermal noise floor power from a neighbor-cell interference/noise floor power value, where the neighbor-cell interference/noise floor power value may be determined by subtracting a measured own-cell power from the total wideband power, and where the thermal noise floor may be determined as discussed in "Soft Uplink Load Estimation in WCDMA," published in IEEE Trans. Vehicular Tech., vol. 58, no. 2, pp. 760-772 in February 2009. Combiner 116 adds $\hat{I}_{oc}(k)$ and $\hat{I}_{nc}(k)$ to generate the modeled interference $\hat{P}(k)$.

Figure 6:
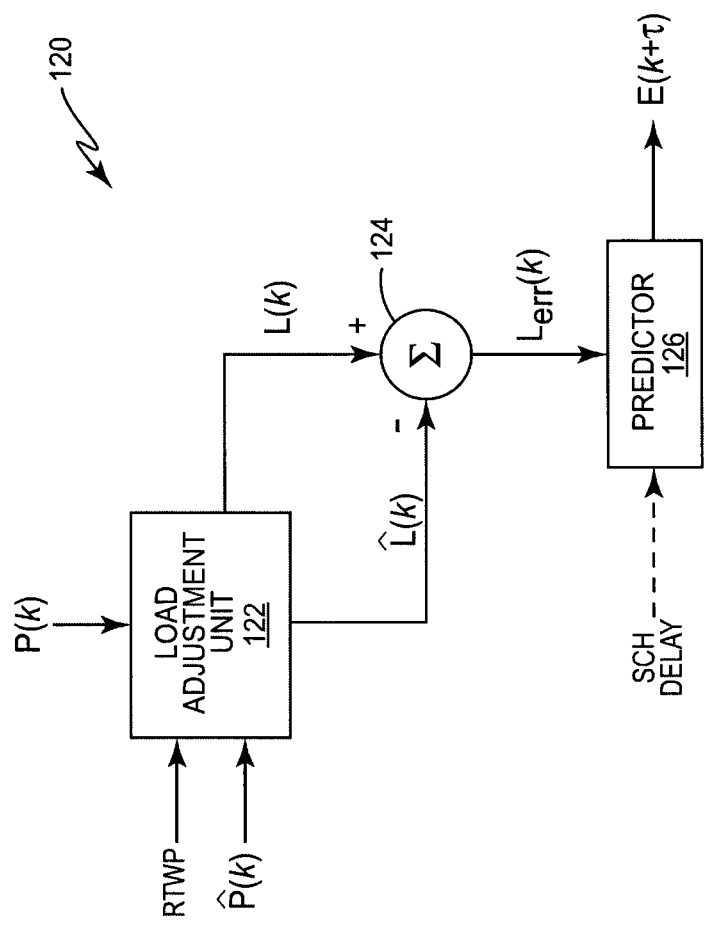
FIG. 6 shows a block diagram of an exemplary prediction unit corresponding to the modeling unit of FIG. 5.

FIG. 6 shows one exemplary prediction unit 120 for predicting the error $E(k+\tau)$ based on modeled and measured interferences. Prediction unit 120 comprises a load adjustment unit 122, combiner 124, and a predictor 126. Load adjustment unit 122 converts the modeled and measured interference to a modeled load $\hat{L}(k)$ and a measured load $L(k)$ based on a RTWP associated with the UEs. For example, load adjustment unit 122 may divide each of the measured and modeled interference by the RTWP to generate the measured and modeled loads. Combiner 124 subtracts the modeled load $\hat{L}(k)$ from the measured load $L(k)$ to determine a load error $L_{err}(k)$. The load error represents the errors in the modeling process. Predictor 126 generates the predicted error $E(k+\tau)$ based on the load error $L_{err}(k)$. In some embodiments, predictor 126 may simply set $E(k+\tau)$ equal to $L_{err}(k)$. In other embodiments, predictor 126 may adjust $L_{err}(k)$ based on an estimated scheduling delay and/or one or more additional parameters. For example, a step-ahead prediction method that generates a prediction $\tau$ steps ahead may be performed based on a dynamic model, which incorporates the capacity to smooth measurement noise and high frequency disturbances. Because the prediction unit 120 of FIG. 6 operates on the load error, it will be appreciated that the predicted error $E(k+\tau)$ output by the prediction unit 120 comprises a predicted load error.

Figure 7:
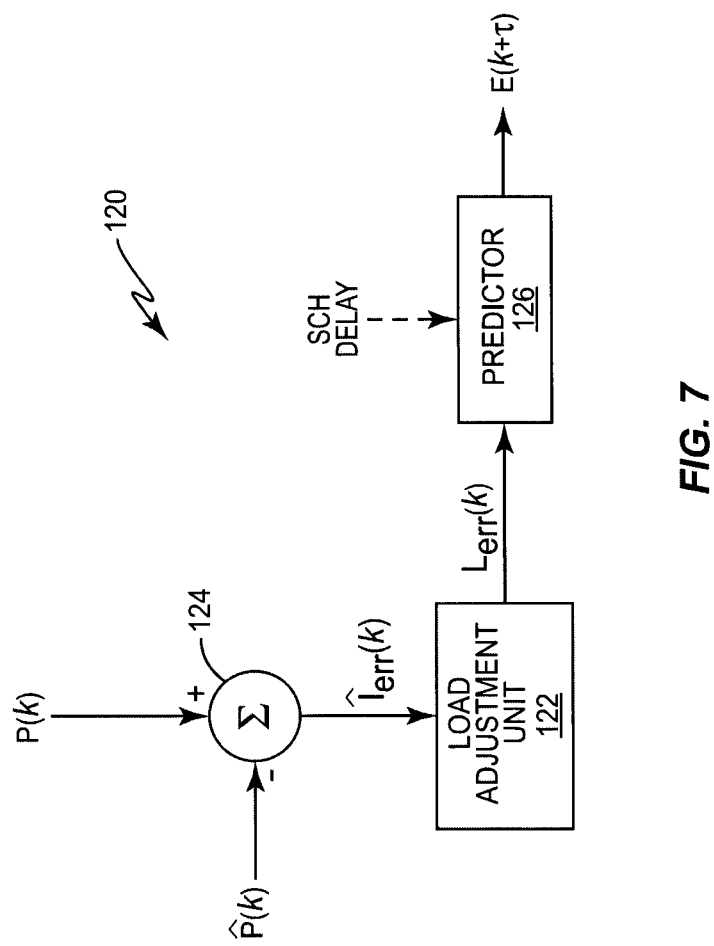
FIG. 7 shows a block diagram of another exemplary prediction unit corresponding to the modeling unit of FIG. 5.

FIG. 7 shows an alternative prediction unit 120 also applicable for predicting the error $E(k+\tau)$ based on modeled and measured interferences. In this embodiment, an interference error $I_{err}(k)$ is first generated by subtracting the modeled interference $\hat{P}(k)$ from the measured interference $P(k)$ at combiner 124. Subsequently, load adjustment unit 122 converts $I_{err}(k)$ to the load error $L_{err}(k)$ based on the RTWP and/or one or more additional parameters, e.g., load factors estimated at the network node, and predictor 126 generates $E(k+\tau)$ based on $L_{err}(k)$, as discussed above. As with the FIG. 6 embodiment, the predicted error $E(k+\tau)$ output by the prediction unit 120 of FIG. 7 comprises a predicted load error.

Figure 8:
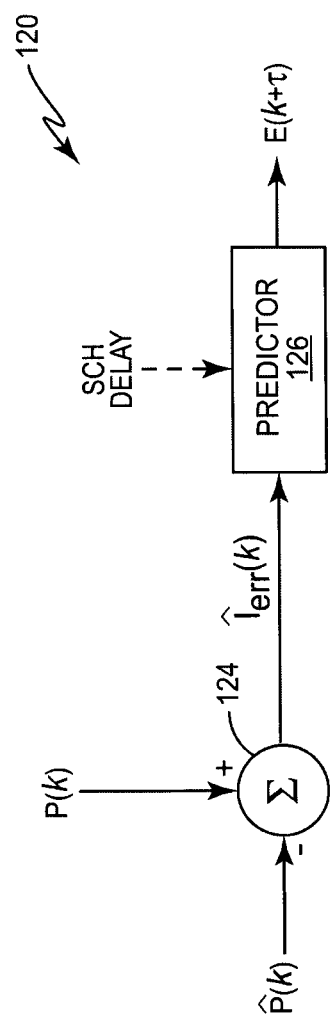
FIG. 8 shows a block diagram of another exemplary prediction unit corresponding to the modeling unit of FIG. 5.

FIG. 8 shows yet another alternative embodiment of the prediction unit 120 applicable for predicting the error $E(k+\tau)$ based on modeled and measured interferences. In this embodiment, an interference error $I_{err}(k)$ is first generated by subtracting the modeled interference $\hat{P}(k)$ from the measured interference $P(k)$ at combiner 124. Subsequently, predictor 126 generates $E(k+\tau)$ based on $I_{err}(k)$, as discussed above. In this case, the predicted error $E(k+\tau)$ output by the prediction unit 120 comprises a predicted interference error.

Figure 9:
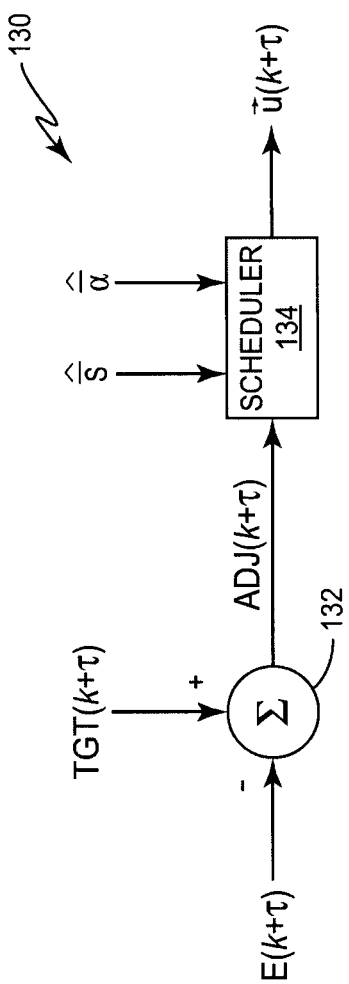
FIG. 9 shows a block diagram of an exemplary scheduling unit for the scheduling system disclosed herein.

The scheduling unit 130 generates new scheduling grants for the subsequent transmission interval $\check{u}(k+\tau)$ based on the predicted error $E(k+\tau)$. FIG. 9 shows an exemplary scheduling unit 130 comprising a combiner 132 and a scheduler 134. Combiner 132 adjusts the target scheduling parameter TGT$(k+\tau)$ provided by controller 160 based on the predicted error $E(k+\tau)$ to generate an adjusted scheduling parameter ADJ$(k+\tau)$. Scheduler 134 generates the vector of scheduling grants $\check{u}(k+\tau)$ based on ADJ$(k+\tau)$. It will be appreciated that the target scheduling parameter, the predicted error, and the adjusted scheduling parameter all comprise a common type of air-interface parameter. For example, when the prediction unit 120 of FIG. 6 or FIG. 7 is used, TGT$(k+\tau)$, $E(k+\tau)$, and ADJ$(k+\tau)$ each comprise a load. Thus, for these examples, the target scheduling parameter comprises a target load, combiner 132 subtracts the predicted load error from the target load to generate an adjusted load, and scheduler 134 generates $\check{u}(k)$ based on the adjusted load. Alternatively, when the when the prediction unit 120 of FIG. 8 is used, TGT$(k+\tau)$, $E(k+\tau)$, and ADJ$(k+\tau)$ each comprise an interference. Thus, the target scheduling parameter comprises a target interference, combiner 132 subtracts the predicted interference error from the target interference to generate an adjusted interference, and scheduler 134 generates $\check{u}(k+\tau)$ based on the adjusted interference. It will be appreciated that while not required, scheduler 134 may convert an input adjusted interference or adjusted load to an adjusted load or adjusted interference, respectively, based on the RTWP.

Scheduler 134 may use any known means to generate the scheduling grants $\check{u}(k+\tau)$. The task of the scheduler 134 is to schedule uplink user traffic and to enhance user and cell capacity while tracking the air-interface cell load, avoiding over-scheduling that may cause cell instability and loss of coverage, tracking other available traffic, e.g., transport resources and hardware, receiving, measuring, and/or estimating quantities relevant for its scheduling operations, and providing the scheduling grants for transmission to the UEs. When doing this, the scheduler 134 needs to operate within the constraints induced by the controlling standard. For example, for 3GPP the constraints comprise a limited grant transmission capacity, grant transmission delays, grant step up rate limitations, and standard limited UE status information. In one example, the scheduler 134 may utilize a "greedy" strategy to fill the available load, where the allocated load for each user is then converted to a grant using $\bar{S}$ and $\hat{\alpha}$. As understood by those skilled in the art, a "greedy" strategy allocates resources to UEs in order of priority, where starting with the highest priority UE, each UE is given as much of the resource as they need and/or request until all available resources are fully allocated.

Figure 10:
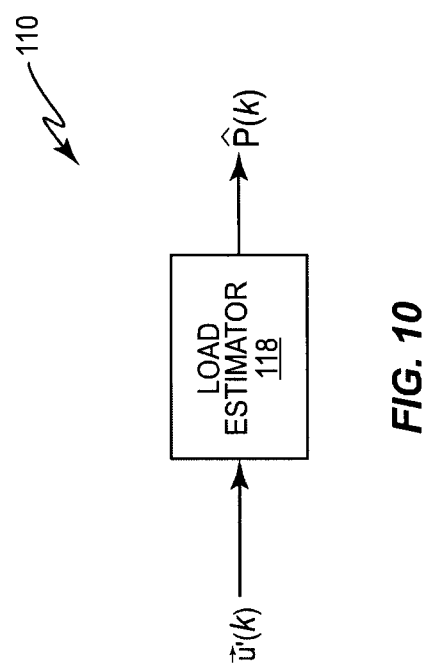
FIG. 10 shows a block diagram of another exemplary modeling unit for the scheduling system disclosed herein.

The scheduling system embodiments disclosed so far rely on a modeled interference. It will be appreciated that the scheduling operations may alternatively rely on a modeled load. For example, FIG. 10 shows an exemplary modeling unit 110 comprising a load estimator 118. Load estimator 118 models the load produced by the UEs based on the received serving grants $\overset{v}{u}'(k)$. For example, the load for each UE may be estimated based on the serving grant $\overset{v}{u}'(k)$, an estimated signal-to-interference ratio (SIR), and an estimated self-interference factor. The load produced by all of the UEs may then be estimated by summing the load estimated for each UE.

Figure 11:
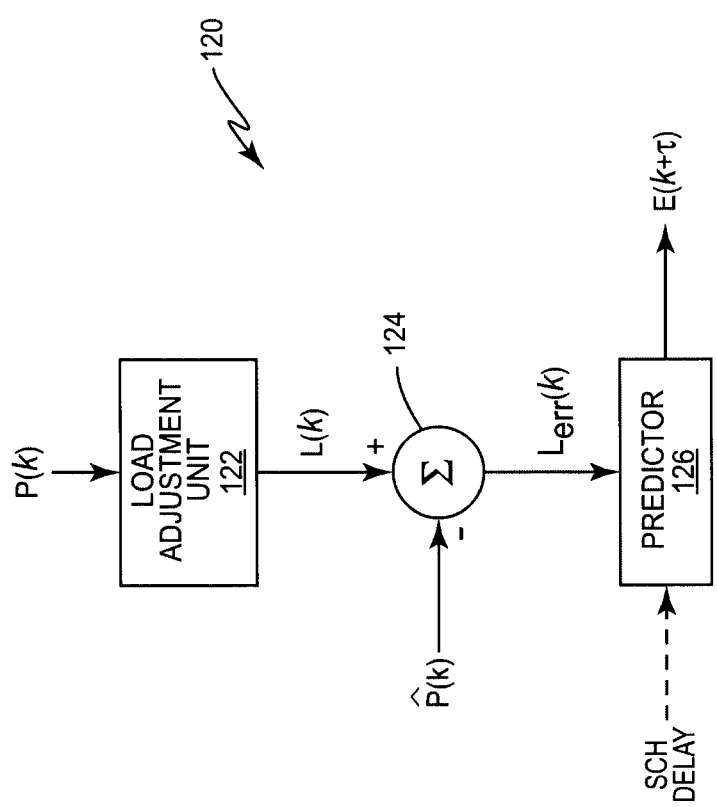
FIG. 11 shows a block diagram of a prediction unit corresponding to the modeling unit of FIG. 10.
Figure 12:
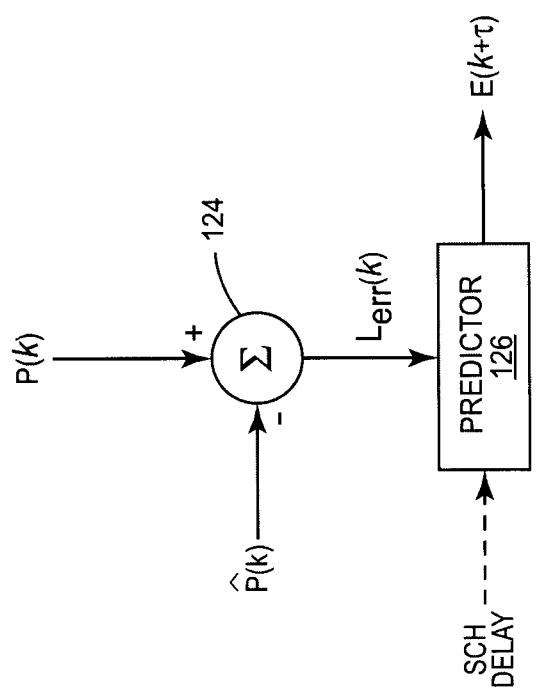
FIG. 12 shows a block diagram of another prediction unit corresponding to the modeling unit of FIG. 10.

The prediction unit predicts the error E(k+τ) as discussed herein. For example, when the UEs report a measured interference P(k), the prediction unit 120 includes a load adjustment unit 122 to convert the reported interference to a load L(k), as shown in FIG. 11. While not explicitly shown, it will be appreciated that the load adjustment unit 122 may alternatively convert the modeled load to a modeled interference compatible with the reported interferences. Alternatively, when the UEs report a measured load, the load adjustment unit 122 is not required, as shown in FIG. 12. In any event, combiner 124 subtracts the modeled load P̂(k) from the measured load L(k) to generate $L_{err}(k)$, and predictor 126 generates the predicted error E(k+τ) based on $L_{err}(k)$.

Figure 13:
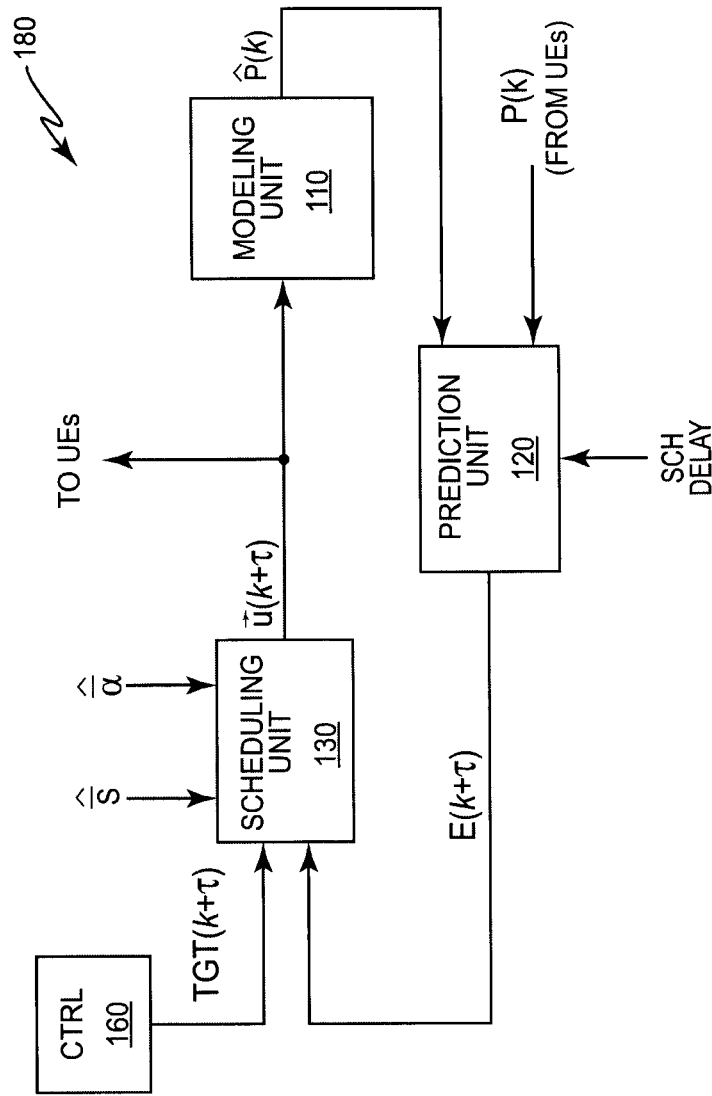
FIG. 13 shows a block diagram of a scheduling system according to another exemplary embodiment.
Figure 14:
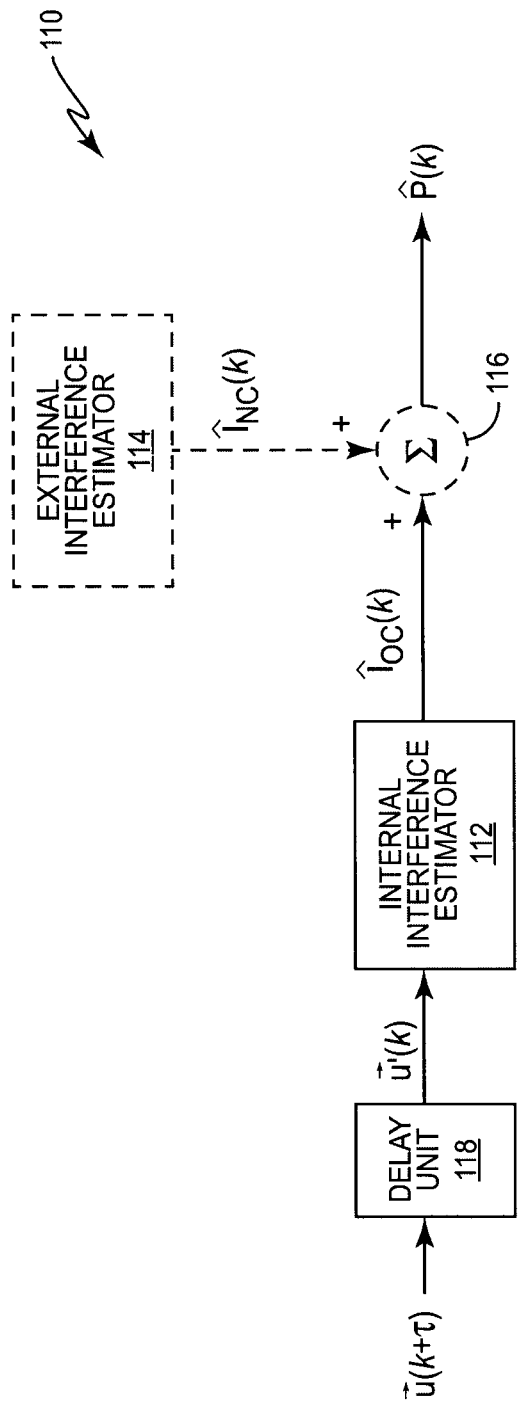
FIG. 14 shows a block diagram of an exemplary modeling unit for the scheduling system of FIG. 13.

The scheduling system discussed 100 herein compensates for scheduling errors based on the serving grants $\overset{v}{u}'(k)$ reported by the UEs to the network node. It will be appreciated, however, that the scheduling system 100 may alternatively compensate for the scheduling errors based directly on the scheduling grants $\overset{v}{u}(k+\tau)$, as shown in FIG. 13, where it is assumed the UE is not power limited and there are no transmission errors. In this case, the modeling units 110 of FIGS. 5 and 10 would be adjusted to model the interference, load, or other air-interface parameter P̂(k) based on the scheduling grants $\overset{v}{u}(k+\tau)$, instead of based on the serving grants $\overset{v}{u}'(k)$. FIG. 14 shows one exemplary modeling unit 110 used to model the interference based on the scheduling grants $\overset{v}{u}(k+\tau)$. In order to more accurately estimate the interference experienced by the UEs based on the scheduling grants received at the UEs, a delay unit 118 first delays the scheduling grants $\overset{v}{u}(k+\tau)$ by τ to account for the delay that occurs between the completion of the scheduling operation and the use of the scheduling grants at the UEs. Subsequently, interference estimator 114 models own-cell interference $\hat{I}_{oc}(k)$ experienced by the UEs based on the delayed scheduling grants $\overset{v}{u}(k)$ using any known techniques. In some embodiments the modeling unit 110 outputs $\hat{I}_{oc}(k)$ as the modeled interference P̂(k). In other embodiments, the modeling unit 110 further includes an external interference estimator 114 and a combiner 116 so as to generate a modeled interference P̂(k) based on own-cell interference $\hat{I}_{oc}(k)$ and neighbor-cell interference $\hat{I}_{nc}(k)$, as discussed herein. It will be appreciated that the modeling unit 110 of FIG. 10 would similarly be modified to include the delay unit 118 and to operate based on the scheduling grants $\overset{v}{u}(k+\tau)$.

Figure 15B:
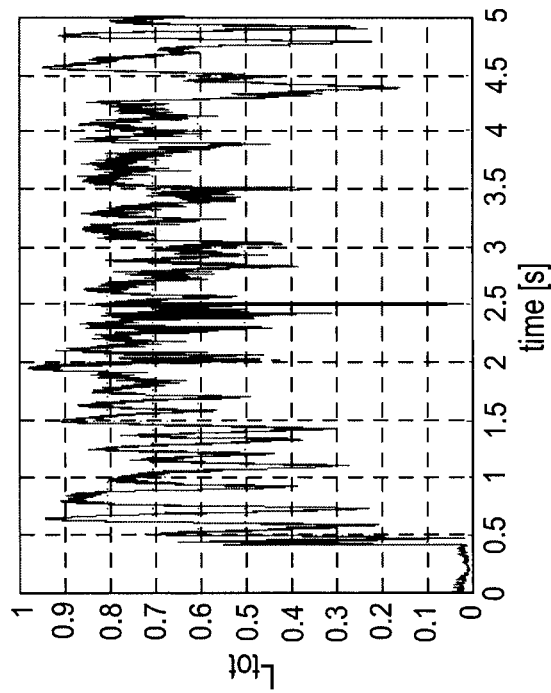
FIGS. 15A and 15B show simulated load results for the exemplary scheduling system disclosed herein.
Figure 15A:
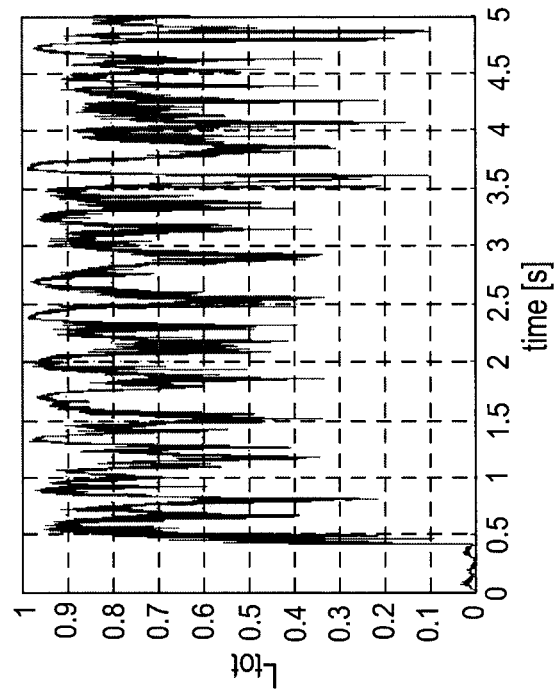
Figure 16A:
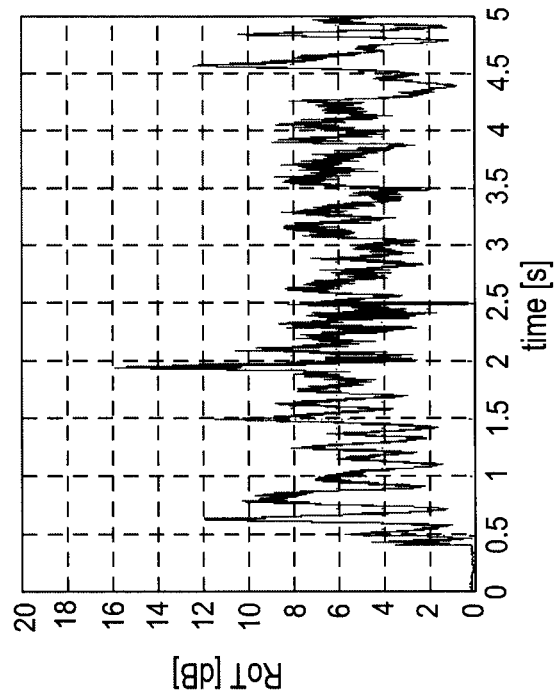
FIGS. 16A and 16B show simulated RoT results for the exemplary scheduling system disclosed herein.
Figure 16B:
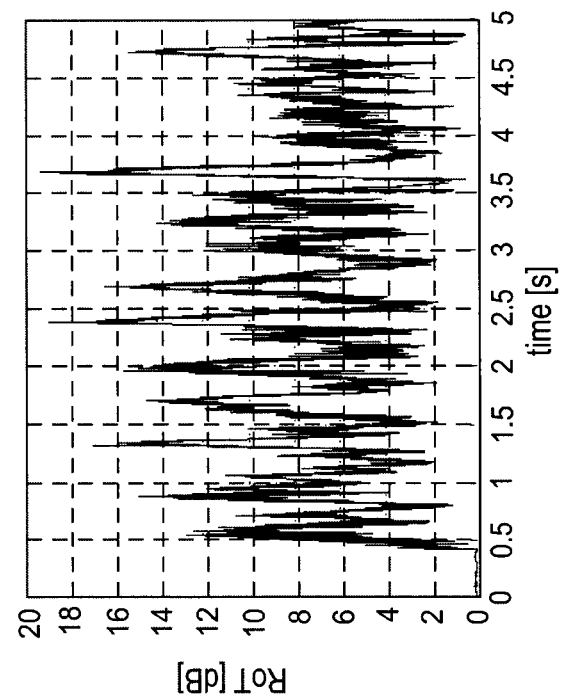

FIGS. 15 and 16 demonstrate the performance improvements achieved by the scheduling system 100 and method 200 disclosed herein. Scheduling system 100 seeks to improve upon the performance of the conventional solutions by achieving an average total load of 0.8 dB, which corresponds to an average RoT of less than 7 dB. FIGS. 15A and 15B show the total results for different realizations of the one cell simulation, while FIGS. 16A and 16B show RoT results. FIGS. 15B and 16B represent a realization where UEs are placed more favorably with better path gain (and thus less variance and more reliable interference modeling) than for the realization of FIGS. 15A and 16A. As shown in both FIGS. 15A and 15B, the average total load is approximately 0.8 dB. Further, as shown in both FIGS. 16A and 16B, the average RoT is less than 7 dB. Thus, the scheduling system 100 disclosed herein provides significant performance improvement over conventional solutions.

The scheduling system 100 disclosed herein has several advantages over conventional scheduling solutions. First, scheduling system 100 is relatively simple and has low computational complexity. Further, the scheduling system 100 introduces feedback measurements in the system and takes system delays into account. As a result, the scheduling unit 130 can better utilize the available uplink resources, thus improving capacity for mobile broadband communications, and providing a means to better observe and maintain cell stability.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by a scheduling system in a network node, of scheduling uplink transmissions from one or more mobile terminals to the network node, said method comprising:
   determining a modeled air-interface parameter associated with said one or more mobile terminals during a current transmission interval based on an earlier set of scheduling grants generated for said one or more mobile terminals;
   determining a predicted error for a subsequent transmission interval based on the modeled air-interface parameter and a measured air-interface parameter reported by said one or more mobile terminals during the current transmission interval; and
   generating a new set of scheduling grants for said one or more mobile terminals for the subsequent transmission interval based on the predicted error.

2. The method of claim 1 wherein the modeled and measured air-interface parameters comprise interference parameters, and wherein determining the modeled air-interface parameter comprises modeling own-cell interference experienced by said one or more mobile terminals during the current transmission interval.

3. The method of claim 1 wherein the modeled and measured air-interface parameters comprise interference parameters, and wherein determining the modeled air-interface parameter comprises:
   modeling own-cell interference experienced by said one or more mobile terminals during the current transmission interval;
   modeling neighbor-cell interference experienced by said one or more mobile terminals during the current transmission interval; and
   combining the own-cell and neighbor-cell interferences to obtain the modeled air-interface parameter.

4. The method of claim 1 wherein generating the new set of scheduling grants comprises:
   adjusting a target scheduling parameter based on the predicted error to obtain an adjusted scheduling parameter; and generating the new set of scheduling grants for the subsequent transmission interval based on the adjusted scheduling parameter.

5. The method of claim 4 further comprising determining the target scheduling parameter based on a rise-over-thermal measurement obtained for an uplink channel associated with one or more of the mobile terminals.

6. The method of claim 1 further comprising receiving a set of serving grants during the current transmission interval generated by the one or more mobile terminals based on an earlier set of scheduling grants sent to the one or more mobile terminals, wherein determining the modeled air-interface parameter comprises determining the modeled air-interface parameter based on the received set of serving grants.

7. The method of claim 1 wherein determining the modeled air-interface parameter comprises determining the modeled air-interface parameter based on the earlier set of scheduling grants.

8. The method of claim 1 wherein the earlier and new sets of scheduling grants comprise absolute grants or relative grants.

9. The method of claim 1 wherein the modeled and measured air-interface parameters comprise interference parameters, the method further comprising:
adjusting the modeled air-interface parameter and the measured air-interface parameter based on a received total wideband power to respectively determine a modeled load and a measured load; and
comparing the modeled load to the measured load to determine a load error;
wherein determining the predicted error comprises determining the predicted error for the subsequent transmission interval based on the load error.

10. The method of claim 1 wherein the modeled and measured air-interface parameters comprise interference parameters, the method further comprising:
comparing the modeled air-interface parameter and the measured air-interface parameter to determine an interference error; and
adjusting the interference error based on a received total wideband power to determine a load error;
wherein determining the predicted error comprises determining the predicted error for the subsequent transmission interval based on the load error.

11. The method of claim 1 wherein the modeled and measured air-interface parameters comprise interference parameters, the method further comprising:
comparing the modeled air-interface parameter and the measured air-interface parameter to determine an interference error;
wherein determining the predicted error comprises determining the predicted error for the subsequent transmission interval based on the interference error.

12. The method of claim 1 wherein the modeled and measured air-interface parameters comprise load parameters, the method further comprising:
comparing the modeled air-interface parameter and the measured air-interface parameter to determine a load error;
wherein determining the predicted error comprises determining the predicted error for the subsequent transmission interval based on the load error.

13. A base station in wireless network to schedule uplink transmissions from one or more mobile terminals to the base station, the base station configured to:
determine a modeled air-interface parameter associated with said one or more mobile terminals during a current transmission interval based on an earlier set of scheduling grants generated for said one or more mobile terminals;
determine a predicted error for a subsequent transmission interval based on the modeled air-interface parameter and a measured air-interface parameter reported by said one or more mobile terminals during the current transmission interval; and
generate a new set of scheduling grants for said one or more mobile terminals for the subsequent transmission interval based on the predicted error.

14. The base station of claim 13 wherein the modeled and measured air-interface parameters comprise interference parameters, and wherein the base station is further configured to model own-cell interference experienced by said one or more mobile terminals during the current transmission interval, wherein said modeled air-interface parameter comprises the modeled own-cell interference.

15. The base station of claim 13 wherein the modeled and measured air-interface parameters comprise interference parameters, and wherein the base station is configured to:
model own-cell interference experienced by said one or more mobile terminals during the current transmission interval; and
model neighbor-cell interference experienced by said one or more mobile terminals during the current transmission interval;
wherein the base station comprises a combiner to combine the own-cell and neighbor-cell interferences to obtain the modeled air-interface parameter.

16. The base station of claim 13 wherein the base station comprises a combiner to subtract the predicted error from a target scheduling parameter to obtain an adjusted scheduling parameter, and wherein the base station is further configured to generate the new set of scheduling grants by generating the new set of scheduling grants for the subsequent transmission interval based on the adjusted scheduling parameter.

17. The base station of claim 16 wherein the base station comprises a controller configured to determine the target scheduling parameter based on a rise-over-thermal measurement obtained for an uplink channel associated with one or more of the mobile terminals.

18. The base station of claim 13 wherein the base station is further configured to receive a set of serving grants during the current transmission interval generated by the one or more mobile terminals based on the earlier set of scheduling grants sent to the one or more mobile terminals, and wherein the base station is configured to determine the modeled air-interface parameter based on the received set of serving grants.

19. The base station of claim 13 wherein the base station is configured to determine the modeled air-interface parameter based on the earlier set of scheduling grants.

20. The base station of claim 13 wherein the earlier and new sets of scheduling grants comprise absolute grants or relative grants.

21. The base station of claim 13 wherein the modeled and measured air-interface parameters comprise interference parameters, and wherein the base station is configured to determine the predicted error by:
adjusting the modeled air-interface parameter and the measured air-interface parameter based on a total wideband power to respectively determine a modeled load and a measured load;

comparing the modeled load to the measured load to determine a load error; and determining the predicted error based on the load error.

22. The base station of claim 13 wherein the modeled and measured air-interface parameters comprise interference parameters, and wherein the base station is configured to determine the predicted error by:

comparing the modeled air-interface parameter to the measured air-interface parameter to determine an interference error;

adjusting the interference error based on a total wideband power to determine a load error; and determining the predicted error based on the load error.

23. The base station of claim 13 wherein the modeled and measured air-interface parameters comprise interference parameters, and wherein the base station is configured to determine the predicted error by:

comparing the modeled air-interface parameter to the measured air-interface parameter to determine an interference error; and determining the predicted error based on the interference error.

24. The base station of claim 13 wherein the modeled and measured air-interface parameters comprise load parameters, and wherein the base station determines the predicted error by:

comparing the modeled air-interface parameter to the measured air-interface parameter to determine a load error; and determining the predicted error based on the load error.

* * * * *